May 11, 1926.

W. L. PALMER

WHEEL OILER

Filed August 4, 1923

1,584,642

W. L. Palmer

INVENTORS

BY Victor J. Evans

ATTORNEY

M. J. Traino
WITNESS:

Patented May 11, 1926.

1,584,642

UNITED STATES PATENT OFFICE.

WILLIAM L. PALMER, OF LONG BEACH, CALIFORNIA.

WHEEL OILER.

Application filed August 4, 1923. Serial No. 655,704.

This invention relates to devices for oiling sheave wheels or the like, or in fact wheels of any other character in which lubrication by the ordinary methods is insufficient, and has for its object the provision of novel means for applying lubricant under a forced feed to the engaging surfaces so that the proper easy running action will be the result with minimum wear.

An important object is the provision of lubricating means for this character which might be built into already existing wheels or which may be formed as a part of new equipment.

An additional object is the provision of lubricating means of this character which will be simple and inexpensive in manufacture and installation, positive in action, efficient and durable in use and a general improvement in the art.

With the above and other objects and advantages in view the invention consists in the details of construction to be hereinafter more fully described and claimed and illustrated in the accompanying drawings, in which:

Figure 1:
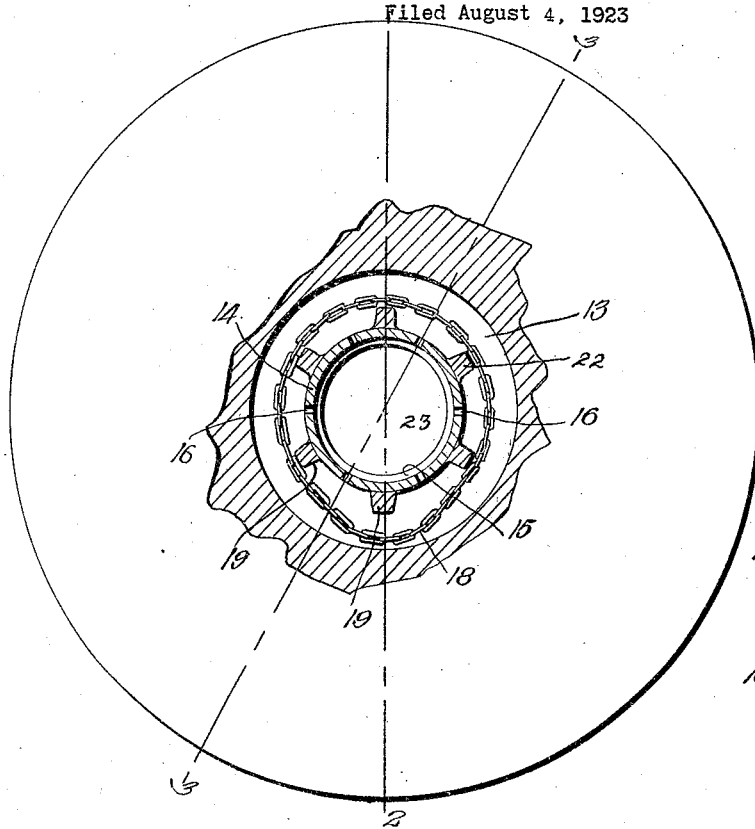
Figure 1 is a side elevation, with parts broken away and in section, of a wheel embodying my invention.
Figure 2:
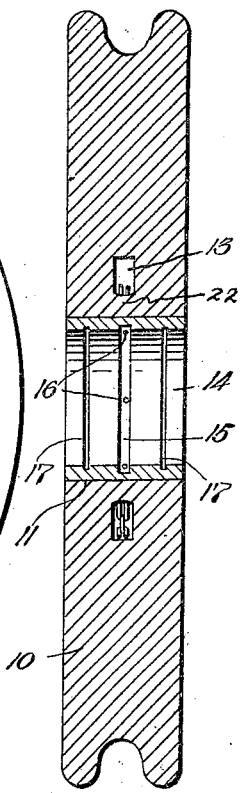
Figure 2 is a cross section therethrough on the line 2—2 of Fig. 1.
Figures 3, 4:
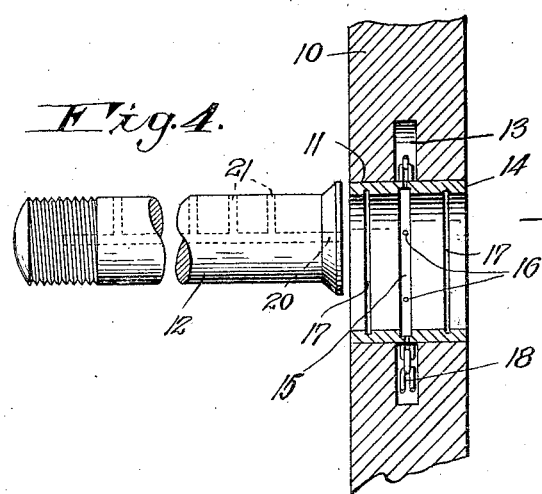
Figure 3 is a cross section on the line 3—3 of Fig. 1.
Figure 4 is a detail view of the shaft or axle.

Referring more particularly to the drawings the numeral 10 designates a sheave wheel or the like which is provided centrally with a hole 11 for engagement upon a suitable shaft or axle 12. In carrying out my invention I provide the wheel with a circular oil recess 13 which may be cored out in the casting. Pressed or otherwise secured within the hole 11 is a suitable bushing 14 formed with a central groove 15 in its inner periphery, this groove communicating with the recess 13 through a plurality of holes 16. The bushing is also formed with other oil grooves 17 at opposite sides of and spaced from the central groove 15. It is preferable to provide a chain 18 which is disposed loosely within the recess 13 and which will act to distribute the oil.

The axle or shaft 12 is formed centrally with a longitudinal oil passage 20 which terminates short of one end but which extends through the other end so that the outlet nozzle of a suitable oil pump or the like may be connected therewith for forcibly injecting oil. This shaft is also provided with holes 21 which extend from the central passage 20 to the outer periphery.

I also provide reinforcing webs 19 which extend from the central hole 11 part way across the recess 13, the chain engaging upon these webs.

In the use of the device it will be apparent that oil is initially forced through the passage 20 in the shaft or axle, by any desired means, and will pass out through the holes 21 into the central groove 15 and thence into the recess 13 through the perforations in the bushing. The oil recess 13 is then filled in this manner, after which it is no longer necessary to force in additional lubricant and whatever oiling device is used may be disconnected or otherwise rendered inoperative. When the wheel is subsequently rotated through any instrumentality it is apparent that the oil within the recess 13 will return through the perforations 16 into the groove 15 and effect thorough and constant lubrication of the shaft or axle so that the wheel will turn freely and without any undue wear.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

In a wheel, lubricating means consisting of a circular channel surrounding the central hole in the wheel provided for the reception of the supporting shaft, a bushing within the hole in the wheel forming a closure for the channel, said bushing being provided on its inner periphery with an oil groove and being formed with holes communicating therewith and with said channel, the groove being adapted to have oil fed thereinto, reinforcing ribs formed integrally with the wheel and extending across the channel at spaced points and terminating short of the outer wall of the channel, and a chain located within the channel and engaging upon said ribs.

In testimony whereof I affix my signature.

WILLIAM L. PALMER.